United States Patent Office 3,489,815
Patented Jan. 13, 1970

3,489,815
NITRO-PHENOXY COMPOUNDS
Wilhelm Kraus, Jr., Werdtweg 5, Bern, Switzerland
No Drawing. Filed Apr. 11, 1966, Ser. No. 541,491
Int. Cl. C07c 43/20
U.S. Cl. 260—613          2 Claims

ABSTRACT OF THE DISCLOSURE

Condensation products of the formula:

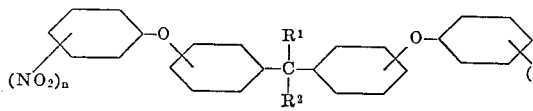

wherein $n$ is 1 to 5 and the benzene rings may be further substituted, and $R_1$ and $R_2$ may be widely variable groups, are prepared by condensation of a compound of the formula

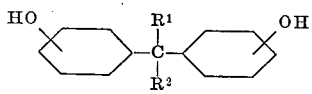

with a corresponding aromatic nitro compound comprising a reactive halogen substituent. Various alternative procedures are described. The nitrated condensation products can be converted to the corresponding amino-substituted compounds, and these can be used as intermediates for the production of e.g. azo dyes.

---

This invention relates to condensation products and to a process for the production thereof wherein a compound having the formula:

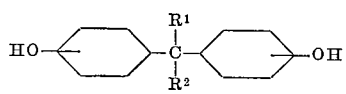

(in which $R^1$ and $R^2$ may be identical or different and may denote hydrogen atoms or aliphatic, aromatic, araliphatic or heterocyclic radicals, and the benzene rings may bear other substituents, for example halogen atoms) is condensed with an aromatic mononitro or polynitro compound containing reactive activated halogen atoms. $R^1$ and $R^2$ may for example be saturated or unsaturated aliphatic radicals or substituted alkyl radicals, for example haloalkyl radicals, for example fluoroalkyl radicals, or unsubstituted or substituted phenyl radicals, for example halophenyl radicals, or unsubstituted or substituted aralkyl radicals. $R^1$ and $R^2$ may also form together a cyclic system, for example a cycloaliphatic system. Thus for example in the condensation of 1 mole of p,p'-dihydroxydiphenylpropane (a large scale starting product in the plastics industry; a monomeric condensation product of 1 mole of acetone with 2 moles of phenol) with 2 moles of 2,4-dinitrochlorobenzene in the presence of acid-binding agents, for example sodium hydroxide, the following nitrated condensation product is obtained:

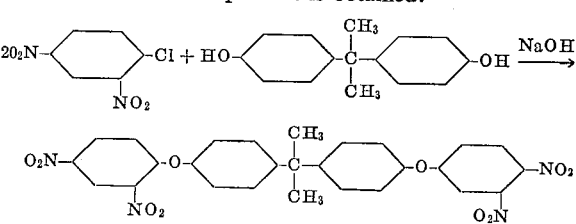

*Analysis.*—Calculated for $C_{27}H_{20}O_{10}N_4$: C, 57.81; H, 3.60; N, 10.00. Found: C, 58.06; H, 3.45; N, 9.84. Molecular weight: 560.46.

The condensation reactions according to the invention may also be carried out with trinitrochlorobenzene. It has been found that an attempt to condense p,p'-dihydroxydiphenylpropane with p-nitrochlorobenzene in the presence of sodium hydroxide at atmospheric pressure and temperatures below 100° C. proceeds negatively. The said attempt at condensation may therefore be carried out using superatmospheric pressure and higher temperatures in an autoclave. Thus condensation products having the following structure may be prepared according to this invention:

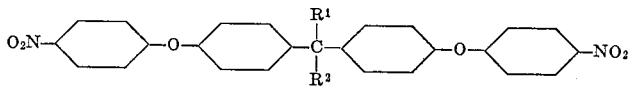

($R^1$ and $R^2$ having the above meanings).

Compounds having the following structure may be obtained by reducing the nitro groups in these compounds to amino groups:

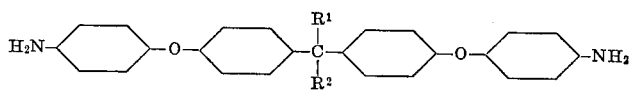

($R^1$ and $R^2$ having the above meanings).

All the condensation reactions according to this invention may quite generally be carried out using superatmospheric pressures and elevated temperatures.

When aromatic mononitro or polynitro compounds which contain activated halogen atoms are condensed in accordance with the present invention, the reaction may be represented as follows:

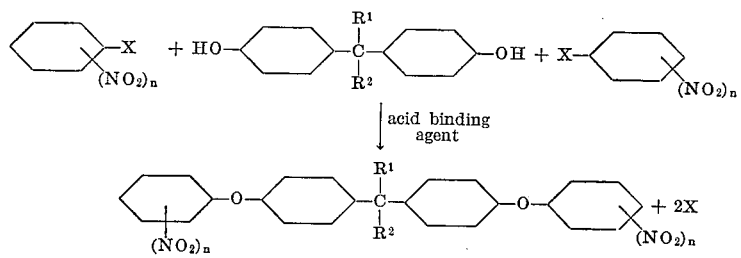

In these formulae, X denotes a fluorine, chlorine, bromine or iodine atom, $n$ denotes one of the integers 1 to 5 and $R^1$ and $R^2$ have the above meanings.

Monomeric condensation products of other aliphatic, aromatic, heterocyclic or araliphatic ketones with phenols, as for example condensation products of haloacetones, for example chlorinated, brominated or fluorinated acetone, cyanoacetone, diacetone alcohol, levulinic acid, propyl ketone, butyl ketone, amyl ketones, vinyl ketones, isopropyl ketones, isobutyl ketones, isoamyl ketones, allyl ketones, symmetrical or unsymmetrical ketones, acetophenone, naphthyl methyl ketone, 2-acetylthiophene, cyclohexanone with phenols, may also be used as condensation partners according to this invention.

When aromatic mononitro or polynitro compounds which contain reactive halogen atoms are condensed according to this invention, the aromatic mononitro or polynitro compounds may be with or without colour. Examples of coloured aromatic mononitro or polynitro compounds of this kind are nitrated halogen-containing anthraquinone compounds, which may be further substituted, for example by substituted amino groups.

The nitrated condensation products obtained according to this invention may be used as intermediates for other chemical reactions and operations, for example for the production of dye and plastics. The nitro groups of the condensation products obtained according to this invention may be reduced to amino groups by a great variety of ways, for example according to Béchamp, with sulphides or polysulphides or by catalytic hydrogenation with or without the use of pressure, advantageously in organic solvents at high temperatures, and the amino compounds thus obtained may be reacted with monofunctional or polyfunctional compounds with or without colour which are capable of reacting with amino groups. Examples of functional groups, compounds, radicals or atoms which will react with amino groups are COOH, COOAlkyl, COHalogen, OH, phosgene, isocyanates, thioisocyanates, CHO, reactive CN groups, reactive halogen atoms, sulphur, chloroform, carbon disulphide, ammonia, acid anhydrides, alkylene oxides, for example ethylene oxide, epoxides, polyepoxides, epichlorohydrin, reactive nitro groups, for example as in nitrohaloanthraquinones, and mixtures of nitrous acid and hydrochloric acid or other tetrazotisation agents (followed by coupling with any passive coupling agents to form azo dyes). In this way, for example dyes or polymerised compositions may be obtained as already mentioned.

The amino compounds obtained by reduction of the nitro groups in nitrated condensation products according to this invention may however also be converted into isocyanates or isothiocyanates and then these isocyanates or isothiocyanates may be reacted with monofunctional or polyfunctional compounds which are capable of reacting with isocyanates or isothiocyanates, for example with ammonia, monoamines, polyamines, glycols, polyglycols, carboxylic acids or other compounds having labile hydrogen atoms. In this way dyes or polymerised compositions may be obtained as already mentioned.

Naturally the condensation products according to the invention may also be for example halogenated, sulphonated or reacted otherwise chemically without changing the nitro groups, the nitro groups in the resultant compounds may be reduced and the amino compounds obtained may be reacted as already described with functional groups, compounds, radicals or atoms capable of reacting with amino groups, for example to form dyes or polymerised compositions.

The amino groups of amino compounds such as are obtainable by reducing nitro groups of nitrated condensation products according to this invention may however be directly converted into hydroxyl groups, for example by conventional methods, as for example with dilute hydrochloric acid, sulphuric acid or phosphoric acid. These hydroxy compounds may be used as intermediates for further chemical reactions and operations, for example for the production of dyes or polymerised compositions. Such hydroxy compounds may for example be reacted with monofunctional or polyfunctional compounds with or without colour, groups, radicals or atoms which will react with hydroxyl groups. Examples of such functional groups or compounds which will react with hydroxyl groups are phosgene, epoxides, polyepoxides, epichlorohydrin, alkylene oxides, for example ethylene oxide isocyanates, thioisocyanates, diazonium compounds, tetrazonium compounds, reactive halogen atoms and acid halides.

In some cases the nitro groups of the nitrated aromatic condensation products according to this invention may be converted direct in one step into hydroxyl groups, for example by boiling with alkaline reagents, such as potassium hydroxide, or with water or an alcohol.

The following is a brief description of a new method for the reduction of aromatic nitro compounds which is based on the reducing power of a mixture of sulphur and caustic soda in a mixture of acetone and methanol, whereas the nitro compounds cannot be reduced in solution in ethanol or in aqueous solution. The ratio of NaOH:S should be 2:1. The reaction period is ninety minutes at waterbath temperature. Yield in the reduction of 2-ethylnitrobenzene is 75% (Chem. and Ind. (1965) 1496).

Heterocyclic compounds containing reactive activated halogen atoms may however also be used as condensation partners according to this invention. These compounds may be with or without colour. The compounds contain four or more atoms in the ring. Examples are: haloazines, for example cyanuric chloride, cyanuric bromide, tetrachloropyrimidine, tetrabromopyrimidine, trichloropyrimidine, tribromopyrimidine, or coloured monohaloazines or polyhaloazines, for example the reaction products of cyanuric halides or polyhalopyrimidines with amines, phenols, alcohols, thiophenols or dyes.

If these heterocyclic condensation products according to this invention still contain reactive activated halogen atoms, they may be reacted with any compounds, with or without colour, which contain free reactive and labile hydrogen atoms, for example with amines, alcohols, phenols, thiophenols and dyes.

The process according to the invention may also be carried out in the presence of condensation catalysts, for example copper compounds or copper powder. The process according to this invention may also be carried out in a melt (fusion method) at elevated temperatures with the necessary additives, for example catalysts or compounds which bind or neutralise acids. Obviously the process according to this invention may be carried out in the presence of high boiling inert organic solvents. The sodium or potassium salts of the compounds having the formula:

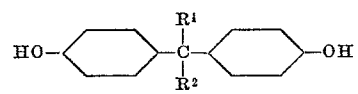

(in which $R^1$ and $R^2$ have the above meanings) may also be considered.

The invention is further illustrated by the following example in which parts are by weight unless otherwise stated. Parts by weight bear the same relation to parts by volume as the gram to the cubic centimetres.

EXAMPLE 1

5 parts of p,p'-dihydroxydiphenylpropane and 8.8 parts of 2,4-dinitrochlorobenzene are dissolved in 50 parts by volume of alcohol by slight heating. While stirring or shaking vigorously, a solution of 2 parts of sodium hydroxide in 20 parts by volume of water is allowed to flow into the said solution and the whole is then heated for a short time at boiling point with vigorous stirring or shaking. The condensation product is thus precipitated while hot in a slightly oily form. It is allowed to cool, the condensation product then becoming solid and easy to filter. The yield of crude product is 11.5 parts, equivalent to 93.5% of the theory. When the product has been recrystallised twice from glacial acetic acid, it has a melting point of 152° to 155° C. The product is insoluble in aqueous alkalies.

I claim:

1. A compound of the formula

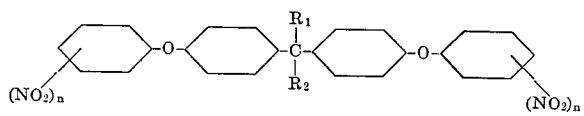

wherein $R^1$ and $R^2$ are like members selected from the group consisting of lower alkyl, lower haloalkyl, lower cyanoalkyl and lower alkenyl, or $R^1$ and $R^2$ together form lower cycloalkyl, or wherein $R^1$ and $R^2$ are different, $R^1$ being lower alkyl when $R^2$ is thienyl, lower carboxyalkyl, phenyl, naphthyl or lower hydroxyalkyl, and wherein $n$ denotes an integer from 1 to 5 inclusive.

2. A compound according to claim 1, said compound corresponding to the formula

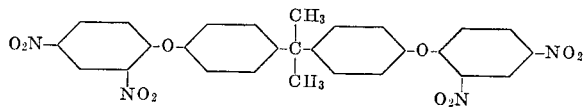

References Cited

UNITED STATES PATENTS

| | | | |
|---|---|---|---|
| 2,959,595 | 11/1960 | Beaver et al. | 260—332.3 |
| 3,024,285 | 3/1962 | Bruin et al. | 260—613 |
| 3,300,444 | 1/1967 | Greenlee | 260—520 |
| 3,305,551 | 2/1967 | Picklesimer et al. | 260—248 |

HENRY R. JILES, Primary Examiner

JOHN M. FORD, Assistant Examiner

U.S. Cl. X.R.

260—248, 249.5, 249.8, 251, 256.4, 256.5, 332.3, 465, 520